US011221869B2

(12) United States Patent
Tsirkin (10) Patent No.: US 11,221,869 B2
(45) Date of Patent: Jan. 11, 2022

(54) MEMORY EFFICIENT HOST VIRTUAL ADDRESS MANAGEMENT FOR HYPERCALLS

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 79 days.

(21) Appl. No.: 16/829,398

(22) Filed: Mar. 25, 2020

(65) Prior Publication Data

US 2021/0303325 A1    Sep. 30, 2021

(51) Int. Cl.
*G06F 9/455* (2018.01)
*G06F 12/1009* (2016.01)
*G06F 12/02* (2006.01)

(52) U.S. Cl.
CPC ........ *G06F 9/45558* (2013.01); *G06F 9/4555* (2013.01); *G06F 12/023* (2013.01); *G06F 12/1009* (2013.01); *G06F 2009/45583* (2013.01); *G06F 2212/1044* (2013.01); *G06F 2212/151* (2013.01); *G06F 2212/152* (2013.01); *G06F 2212/657* (2013.01)

(58) Field of Classification Search
CPC .. G06F 9/45558; G06F 12/023; G06F 9/4555; G06F 12/1009; G06F 2212/657; G06F 2212/152; G06F 2212/1044; G06F 2009/45583; G06F 2212/151
See application file for complete search history.

(56) References Cited

U.S. PATENT DOCUMENTS

| | | | |
|---|---|---|---|
| 9,619,401 B2 | 4/2017 | Gandhi et al. | |
| 9,632,725 B2 | 4/2017 | Munetoh | |
| 9,672,354 B2 | 6/2017 | Lutas et al. | |
| 10,296,465 B2 | 5/2019 | John et al. | |
| 10,977,188 B1* | 4/2021 | Lercari | G06F 3/0616 |
| 2016/0062802 A1* | 3/2016 | Guan | H04L 49/9068 |
| | | | 711/148 |
| 2016/0246730 A1* | 8/2016 | Gandhi | G06F 9/45558 |
| 2016/0246732 A1* | 8/2016 | Shanbhogue | G06F 12/1009 |
| 2018/0373647 A1* | 12/2018 | Dewan | G06F 12/10 |

(Continued)

OTHER PUBLICATIONS

Max Laier, "Towards Power-Aware Memory for Virtual Machines", https://os.itec.kit.edu/downloads/da_2009_laier-max_pamm4vm.pdf, Nov. 30, 2009, 65 pages.

(Continued)

*Primary Examiner* — Sean D Rossiter
(74) *Attorney, Agent, or Firm* — Lowenstein Sandler LLP (57) ABSTRACT

Systems and methods for managing host virtual addresses in a hypercall are disclosed. In one implementation, a processing device may receive, by a hypervisor managing a virtual machine (VM), a hypercall initiated by the VM, wherein a first parameter of the hypercall specifies a guest physical address (GPA) of a memory buffer and a second parameter of the hypercall specifies a host virtual address (HVA) of the memory buffer. The processing device may also translate the GPA to a first host physical address (HPA) and may translate the HVA to a second HPA. The processing device may further compare the first HPA to the second HPA and responsive to determining that the first HPA matches the second HPA, the processing device may execute the hypercall using the HVA.

20 Claims, 5 Drawing Sheets

(56) References Cited

U.S. PATENT DOCUMENTS

| | | | |
|---|---|---|---|
| 2019/0034633 A1* | 1/2019 | Seetharamaiah | G06F 21/53 |
| 2019/0205149 A1* | 7/2019 | Zhang | G06F 9/45545 |
| 2020/0073689 A1* | 3/2020 | Tsirkin | G06F 3/0665 |
| 2020/0073691 A1* | 3/2020 | Tsirkin | H04L 63/105 |
| 2020/0242263 A1* | 7/2020 | Hajnoczi | G06F 9/5016 |

OTHER PUBLICATIONS

Yubin Xia et al., "Architecture Support for Guest-Transparent VM Protection from Untrusted Hypervisor and Physical Attacks", http://class.ece.iastate.edu/tyagi/cpre581/papers/HPCA13VMProtection.pdf, Institute of Parallel and Distributed Systems, Shanghai Jiao Tong University, 2013, 12 pages.

Jayneel Gandhi et al., "Efficient Memory Virtualization", http://pages.cs.wisc.edu/~swift/papers/micro14-virtualization.pdf, Department of Computer Sciences University of Wisconsin-Madison Madison, WI, USA; AMD Research Advanced Micro Devices, Inc. Austin, TX, USA, 2014, 12 pages.

* cited by examiner

MEMORY EFFICIENT HOST VIRTUAL ADDRESS MANAGEMENT FOR HYPERCALLS

TECHNICAL FIELD

The disclosure is generally related to virtualization systems, and is more specifically related to memory efficient host virtual address management for hypercalls.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to memory efficient host virtual address management for hypercalls.

Certain processor architectures support virtualization by providing special instructions for facilitating virtual machine execution. In certain implementations, a processor may support executing a hypervisor that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources. When a VM needs to perform a privileged operation (e.g., perform an I/O operation), the VM may do so by sending a hypercall to the hypervisor, requesting that the hypervisor perform the privileged operation on behalf of the VM. Thus a hypercall refers to a privileged processor operation that can be invoked by a virtual machine without performing a VM exit.

Handling hypercalls from virtual machines by the hypervisor frequently require accessing one or more memory buffers that are passed as parameters of the hypercall from the VM to the hypervisor, for example to read data from the memory buffers and/or write data to the memory buffers. In order to access the memory buffers, the hypervisor needs to map the guest memory address of the memory buffer that is provided by the VM to the corresponding address in the host virtual address space. This guest address to host address translation represents a significant source of overhead for the hypervisor. For example, when a guest memory address space for a given VM is significantly large, the hypervisor pages tables that are used for mapping a guest address to a host virtual address can be significantly large, thus the performance penalty for parsing these page tables to find a particular address range can be significant.

Conventionally, the hypervisor may implement techniques such as hash tables to expedite scanning the page tables that maps guest memory space to host virtual memory space. These solutions, however, adds run-time overhead to keep the page tables in sync with internal page tables of the host. Additionally, it introduces additional memory overhead for creating and maintaining additional hash tables to accessing the hypervisor page tables that maps guest memory space to host memory space.

Aspects of the disclosure address the above and other deficiencies by providing memory efficient host virtual address management for hypercalls. A hypercall issued by a virtual machine (VM) would typically include an address to a memory buffer, which the VM has allocated for transferring one or more parameter values to the hypervisor and/or receive one or more parameter values produced by the hypervisor executing the hypercall. In an illustrative example, the VM may issue a hypercall to the hypervisor to read data from a file in a file system of the host into a memory buffer. However, instead of specifying just the guest physical address (GPA) of the memory buffer, the VM may also specify the host virtual address (HVA) of the memory buffer, thus relieving the hypervisor from maintaining the above-noted guest physical to host virtual address translation tables. However, since in general the VM should not be trusted by the hypervisor (and thus may presumably supply a HVA that does not in fact correspond to the GPA of the memory buffer allocated by the VM for servicing the hypercall, the hypervisor should validate the HVA before using it for executing the hypercall. In an illustrative example, the validation may involve comparing two host physical addresses (HPAs) produced, respectively, by translating the GPA supplied by the hypercall to a corresponding HPA, and translating the HVA supplied by the hypercall to a corresponding HPA. Notably, both translations may be performed by the hypervisor using the respective GPA-HPA and HVA-HPA translation tables, which are already maintained by the hypervisor for other uses, and those two translations may be performed much more efficiently than a direct GVA-HVA translation that would need to be performed otherwise. Accordingly, should the two HPAs yielded by the respective GPA-HPA and HVA-HPA translations match, the HVA supplied by the VM may be considered as being true HVA corresponding to the VM-supplied GPA, and the hypervisor may proceed to execute the hypercall utilizing the validated HVA.

On the other hand, should the two HPAs yielded by the respective GPA-HPA and HVA-HPA translations fail to match, the hypervisor may notify the VM that the hypercall has not been executed by returning an error to the VM. In implementations, the error status may be communicated to the VM as an error code indicating that the hypercall execution has failed. In another example, the error code may additionally indicate to the VM that at least one of the HVA or the GPA that are provided as parameters in the hypercall is invalid.

In order to supply the HVA with the hypercall, the VM may, upon allocating the memory buffer or at a later time, request the HVA of the memory buffer from the hypervisor. Such a request may be performed via a paravirtualized interface. Paravirtualization refers to a virtualization technique which involves modifying the guest operating system in order to allow more efficient performance of certain functions in the virtualized environment, as compared to the same operating system running directly on the underlying hardware. Accordingly, a paravirtualized interface refers to an interface that is missing from the operating system running directly on the underlying hardware, and is added to the guest operating system in order to allow more efficient performance of certain functions in the virtualized environment.

Thus, implementations of the disclosure utilize existing virtual machine page tables and hypervisor page tables that are maintained by the hypervisor to improve performance and memory utilization of the host system in a virtualized environment. By supplying both the GPA and the HVA of the memory buffer as hypercall parameters, the guest operating system relieves the hypervisor from maintaining a shadow translation table mapping the guest virtual address space of the VM to the host virtual address space. Since validation of the HVA provided by the VM can be performed using existing page tables that are maintained by the hypervisor for other uses, the methods of the present disclosure do not burden the hypervisor with maintaining any additional data structures. By eliminating the need maintain a shadow translation table mapping the guest virtual address space of the VM to the host virtual address space, the host memory consumption is significantly reduced, thus resulting in improved performance of executing hypercalls by the host.

Figure 1:
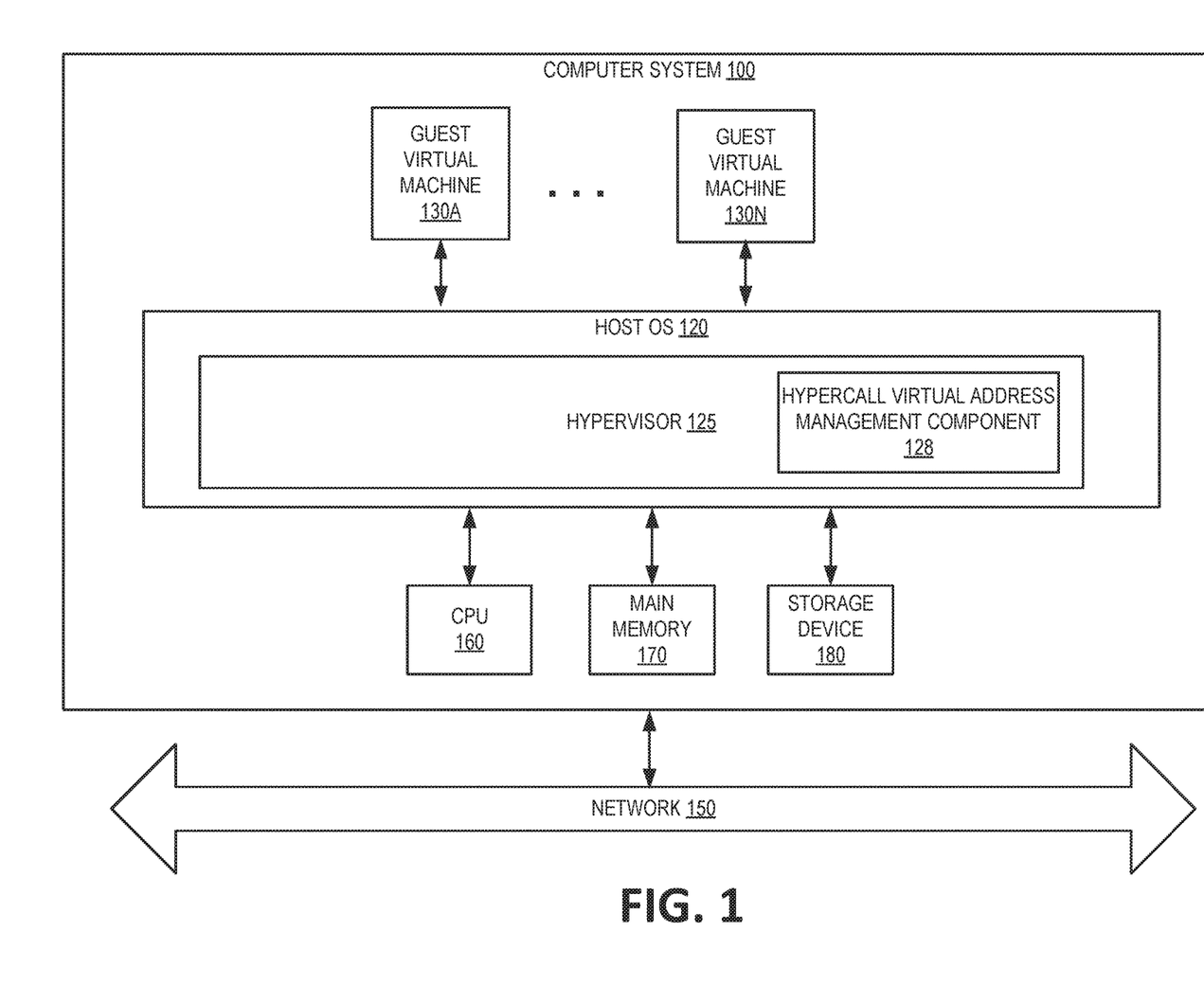
FIG. 1 depicts a high-level diagram of an example system architecture operating in accordance with one or more aspects of the disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1. As shown in FIG. 1, the computer system 100 is connected to a network 150 and comprises central processing unit (CPU) 160, main memory 170, which can include volatile memory devices (e.g., random access memory (RAM)), non-volatile memory devices (e.g., flash memory), and/or other types of memory devices, and storage device 180 (e.g., a magnetic hard disk, a Universal Serial Bus (USB) solid state drive, a Redundant Array of Independent Disks (RAID) system, a network attached storage (NAS) array, etc.) that serves as a secondary memory, interconnected as shown. Although, for simplicity, a single CPU is depicted in FIG. 1, in some other embodiments computer system 100 can comprise a plurality of CPUs. Similarly, in some other embodiments computer system 100 can comprise a plurality of storage devices 180, rather than a single storage device 180. The computer system 100 can be a server, a mainframe, a workstation, a personal computer (PC), a mobile phone, a palm-sized computing device, etc. The network 150 can be a private network (e.g., a local area network (LAN), a wide area network (WAN), intranet, etc.) or a public network (e.g., the Internet).

Computer system 100 runs a host operating system (OS) 120, which can comprise software that manages the hardware resources of the computer system and that provides functions such as inter-process communication, scheduling, virtual memory management, and so forth. In some examples, host operating system 120 also comprises a hypervisor 125, which provides a virtual operating platform for guest VMs 130A-130N and manages their execution. Each VM 130A-N can be software implementation of a machine that executes programs as though it were an actual physical machine. It should be noted that in some other examples, hypervisor 125 can be external to host OS 120, rather than embedded within host OS 120. As shown, hypervisor 125 can include hypercall virtual address management component 128 that may facilitate memory efficient virtual address management for executing hypercalls by the hypervisor.

When hypercall virtual address management component 128 receives a hypercall from VM 130A, the hypercall may include parameters referencing a memory buffer that may be accessed by hypercall virtual address management component 128 to perform the hypercall. VM 130A may send at least two parameters as part of the hypercall. One of the parameters may be a guest physical address (GPA) of the memory buffer. The other parameter may be a host virtual address (HVA) of the memory buffer. In implementations, VM 130A may request the HVA of the memory buffer from hypervisor 125 using a paravirtualized interface before initiating the hypercall to hypervisor 125. When the VM 130A receives the HVA of the memory buffer, VM 130A may initiate the hypercall with two references to the memory buffer, the GPA and the HVA.

Hypercall virtual address management component 128 may then use the HVA that is identified in the hypercall to access the memory buffer referenced by the hypercall. In implementations, hypercall virtual address management component 128 may validate the HVA received from VM 130A before using the HVA when executing the hypercall, to ensure that VM 130A provided a valid HVA for the memory buffer. To perform this validation, hypercall virtual address management component 128 may use a hypervisor page table that is maintained by hypervisor 125 for translating the HVA to a host physical address (HPA) of the memory buffer. Hypercall virtual address management component 128 may also use a shadow page table (e.g., a virtual machine page table) that is maintained by hypervisor 125 for translating the GPA to another HPA. After translating the HVA into a first HPA and the GPA into a second HPA, hypercall virtual address management component 128 may compare the first HPA and the second HPA to find out is the two HPAs match each other (e.g., the two HPAs match if the two HPAs are identical to one another). If hypercall virtual address management component 128 determines that the two HPAs match, hypercall virtual address management component 128 may determine that the HVA that is provided by VM 130A is valid. Hypercall virtual address management component 128 may then proceed to execute the hypercall using the HVA to access the memory buffer, without the need to map the guest address space to the host address space.

Alternatively, if hypercall virtual address management component 128 determines that the first HPA does not match the second HPA (e.g., by determining that the first HPA is not identical to the second HPA), hypercall virtual address management component 128 may decide that the HVA that is provided by VM 130A is invalid, and may determine that the hypercall may not be executed. In this case, hypercall virtual address management component 128 may notify VM 130A that the hypercall has not been executed by returning an error to VM 130A, indicating that the HVA is invalid. In certain implementations, hypercall virtual address management component 128 may send the HVA corresponding to the GPA to VM 130A. VM 130A may subsequently use the valid HVA when issuing a new hypercall to the hypervisor, without having to make a separate request for the HVA from the hypervisor.

Figure 2:
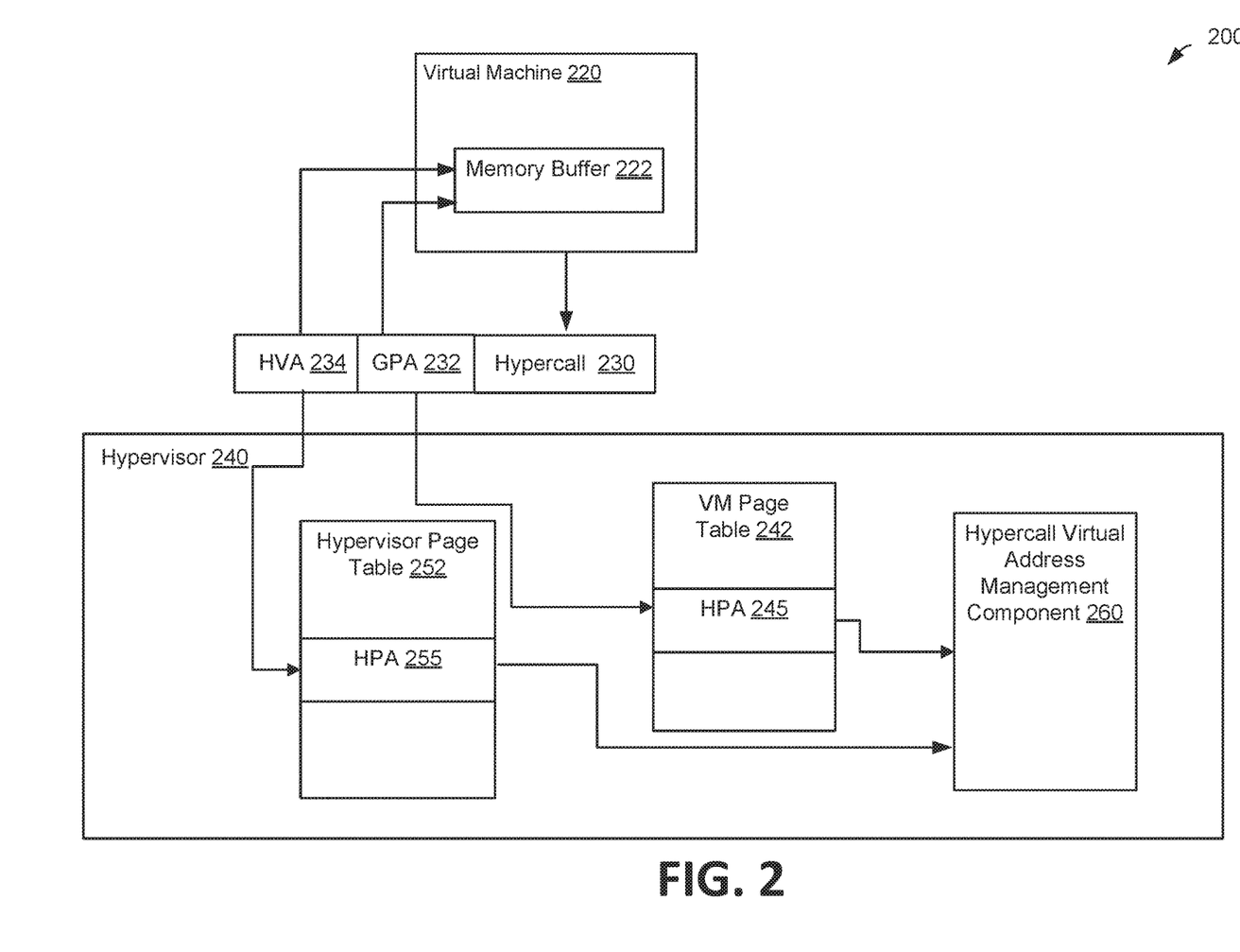
FIG. 2 depicts a block diagram of an apparatus illustrating the translation of a guest physical address (GPA) and a host virtual address (HVA) of a hypercall from a virtual machine to the hypervisor, in accordance with one or more aspects of the present disclosure.

FIG. 2 depicts a block diagram of an apparatus 200 illustrating the translation of a guest physical address (GPA) and a host virtual address (HVA) of a hypercall from a virtual machine to the hypervisor, in accordance with one or more aspects of the present disclosure. The apparatus 200 may be compared to computer system 100 of FIG. 1. For example, the apparatus 200 includes hypercall virtual address management component 260 (which may be compared to hypercall virtual address management component 128 of FIG. 1), virtual machine (VM) 220 (which may be compared to the VMs 130A-130N of FIG. 1) and hypervisor 240 (which may be compared to hypervisor 125 of FIG. 1).

In some implementations, VM 220 transmits hypercall 230 to hypervisor 240, for example, to request the execution of a privileged operation from hypervisor 240. Privileged operation may be an operation that the VM does not have access to execute, thus the VM makes a request to the hypervisor to execute. An example of a privileged operation may be reading data from a file that is stored in a storage device accessible by the host. In this case, VM 220 may send a reference to memory buffer 222 that may be accessed by hypervisor 240 to perform hypercall 230. In certain implementations, in order to avoid mapping the guest address space to the host address space, VM 220 may send two references to memory buffer 222 as parameters to hypercall 230; guest physical address (GPA) 232 and host virtual address (HVA) 234 of memory buffer 222. In implementations, VM 220 may request HVA 234 of memory buffer 222 from hypervisor 240 using a paravirtualized interface before initiating hypercall 230 to hypervisor 240. VM 220 may provide HVA 234 as a parameter to hypercall 230 and may send hypercall 230 to hypervisor 240.

When hypervisor 240 receives hypercall 230 from VM 220, hypervisor 240 may use HVA 234 hypercall 230 to access memory buffer 222 after validating that HVA 234 is a correct address for memory buffer 222. To perform this validation, hypervisor 240 may use VM page table 242 to translate GPA 232 from the hypercall to HPA 245. VM page table 242 may be a page table that is maintained by the host to translate guest VM physical memory addresses to host physical memory addresses. In implementations, VM page table 242 may be cached to enable faster access and consequently faster memory address translation. Hypervisor may further use hypervisor page table 252 to translate HVA 234 from the hypercall to HPA 255. Similar to VM page table 242, hypervisor page table 252 may be a page table that is maintained by the host to translate host virtual memory addresses to host physical memory addresses. In implementations, hypervisor page table 252 may be cached to enable faster access and consequently faster memory address translation.

After translating GPA 232 to HPA 245 and HVA 234 to HPA 255, hypervisor 240 may send HPA 245 and HPA 255 to hypercall virtual address management component 260 to validate the HPAs and execute hypercall 230. In implementations, hypercall virtual address management component 260 may compare HPA 245 and HPA 255 to find out if the two HPAs match each other (e.g., HPA 245 matches HPS 255 if HPA 245 is identical to HPA 255). If hypercall virtual address management component 260 determines that the two HPAs match, hypercall virtual address management component 260 may determine that HVA 234 that is provided by VM 220 in hypercall 230 is valid, and hypercall virtual address management component 260 may thus proceed to execute hypercall 230 using HVA 234 to access memory buffer 222.

On the other hand, if hypercall virtual address management component 260 determines that HPA 245 does not match HPA 255, the hypercall virtual address management component 260 may decide that HVA 234 that is provided by VM 220 is invalid, and may thus determine that hypercall 230 may not be executed. In certain implementations, hypercall virtual address management component 260 may then notify VM 220 that hypercall 230 has not been executed by returning an error to VM 220. In implementations, the error status may be communicated to VM 220 as an error code indicating that hypercall 230 execution has failed. In another example, the error code may additionally indicate to VM 220 that at least one of HVA 234 or GPA 232 that are provided as parameters in hypercall 230 is invalid. In other implementations, in addition to sending an error code to VM 220, hypercall virtual address management component 260 may also send to VM 220 the valid HVA that corresponds to GPA 232 of memory buffer 222. In this case, VM 220 may issue another hypercall to hypervisor 240 using the valid HVA without having to issue another request for an HVA from hypervisor 240.

Figure 3:
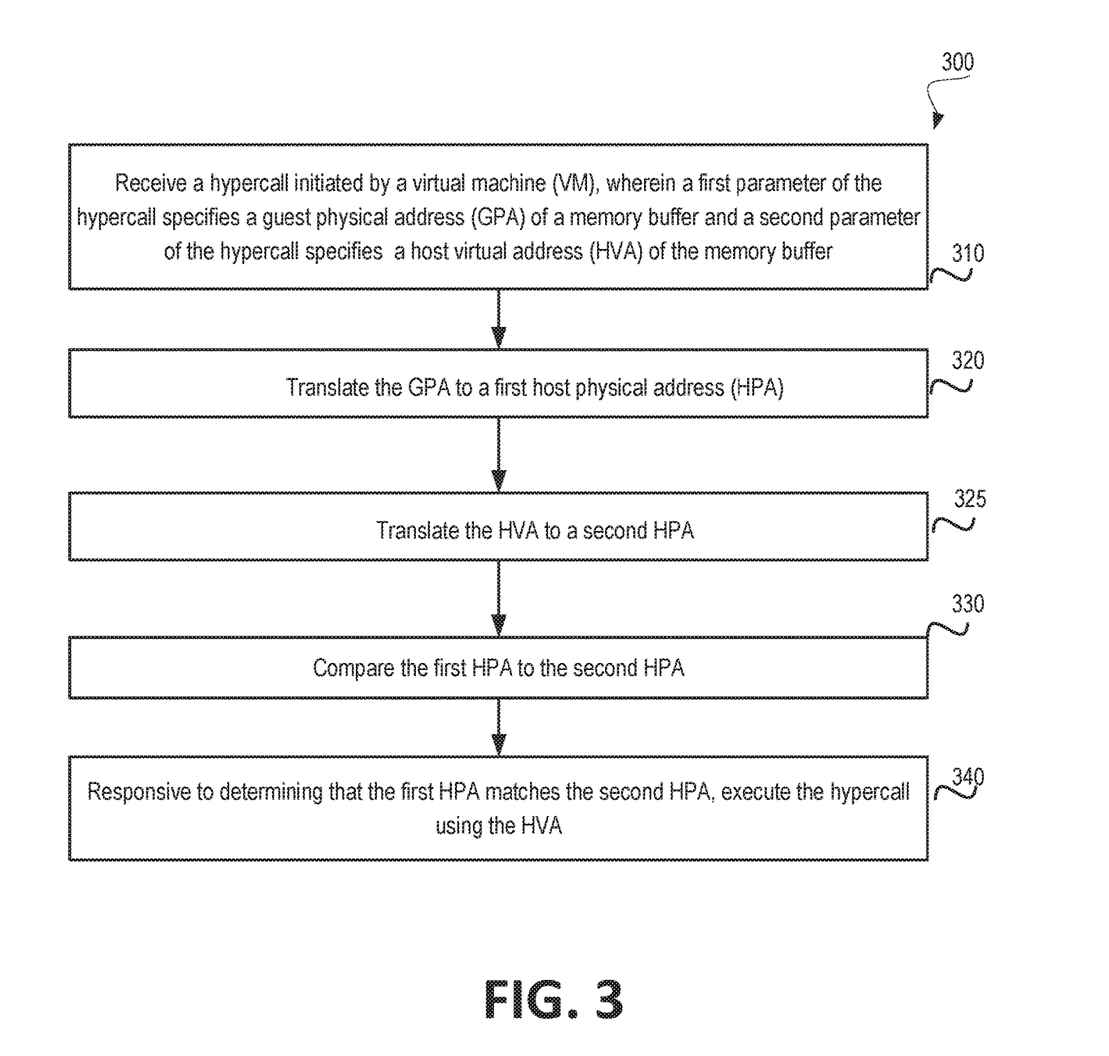
FIG. 3 is a flow diagram of an example method of memory efficient host virtual address management for hypercalls, in accordance with one or more aspects of the present disclosure.

FIG. 3 is a flow diagram of an example method of memory efficient host virtual address management for hypercalls, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 100 of FIG. 1 or apparatus 200 of FIG. 2) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Method 300 may begin at block 310. At block 310, the processing logic may receive, by a hypervisor managing a virtual machine (VM), a hypercall initiated by the VM. The hypercall may have at least two parameters; a first parameter specifying a guest physical address (GPA) of a memory buffer and a second parameter specifying a host virtual address (HVA) of the memory buffer. The memory buffer may be accessed by the hypervisor when executing the hypercall. In implementations, the processing logic may use the HVA to access the memory buffer after validating that the HVA is a correct address for the memory buffer, as described in more detail herein above.

At block 320, the processing logic may translate the GPA to a first host physical address (HPA). Similarly, at block 325, the processing logic may translate the HVA to a second HPA. In implementations, the processing logic may use a VM page table and a hypervisor page table that are maintained by the hypervisor, in order to perform the translation, as described in more detail herein.

At block 320, the processing logic may compare the first HPA and the second HPA to determine whether the two HPAs match. In implementations, the processing logic may determine that the HVA is a valid address for the memory buffer if the HPA corresponding to the GPA from the VM matches the HPA corresponding to the HVA from the VM. At block 340, when the processing device determines that the first HPA matches the second HPA, the processing device may determine that the HVA is a valid address for the memory buffer and may execute the hypercall, as described in more detail herein.

Figure 4:
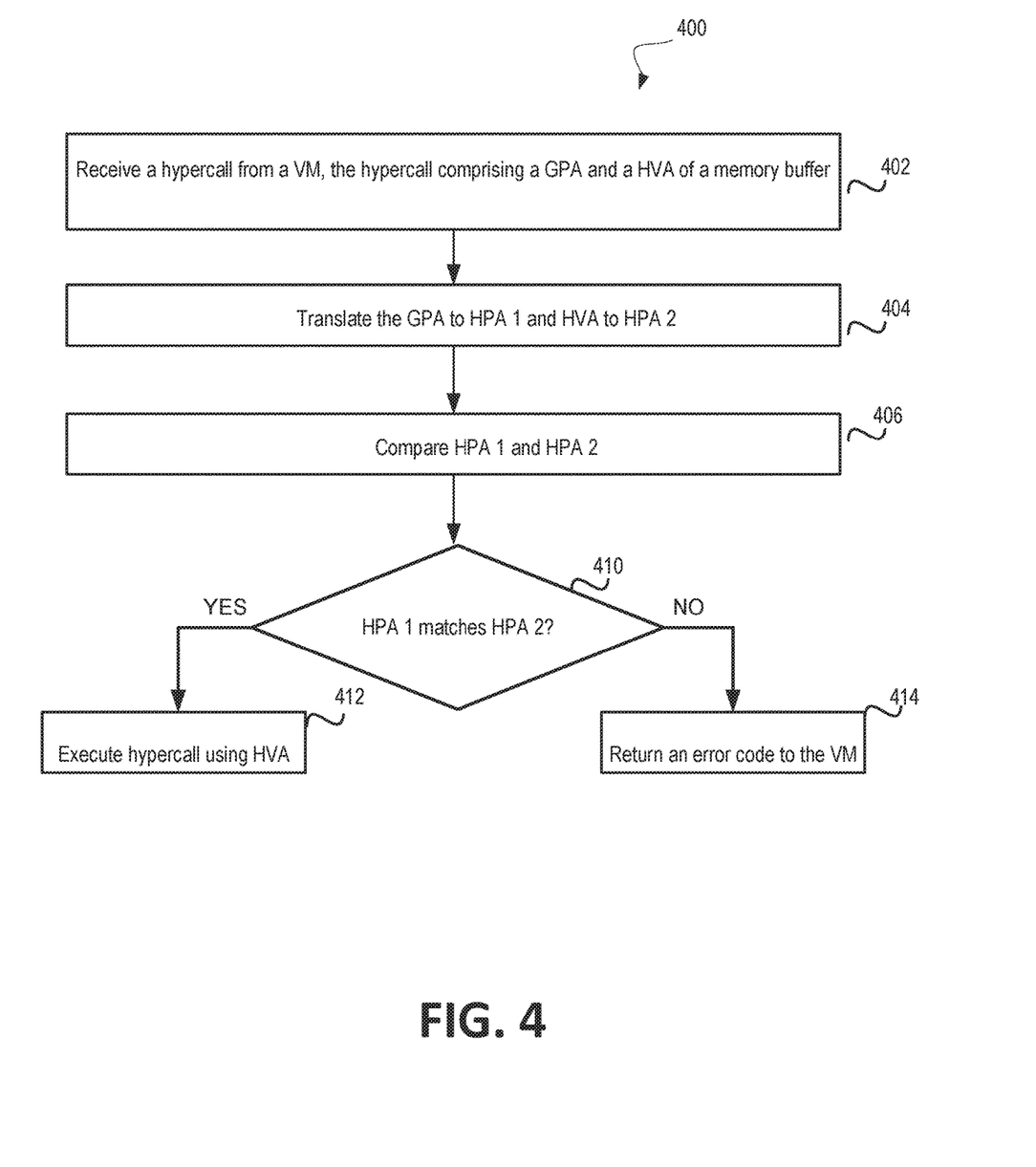
FIG. 4 is a flow diagram of another example method of memory efficient host virtual address management for hypercalls, in accordance with one or more aspects of the present disclosure.

FIG. 4 is a flow diagram of another example method of memory efficient host virtual address management for hypercalls, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 100 of FIG. 1 or apparatus 200 of FIG. 2) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Method 400 may begin at block 402. At block 402, the processing logic may receive, by a hypervisor managing a virtual machine (VM), a hypercall comprising at least two parameters; a first parameter specifying a guest physical address (GPA) of a memory buffer and a second parameter specifying a host virtual address (HVA) of the memory buffer. The memory buffer may be accessed by the hypervisor when executing the hypercall, as described in more detail herein above.

At block 404, the processing logic may translate the GPA of the hypercall to a host physical address HPA 1 and may also translate the HVA of the hypercall to HPA 2. In implementations, the processing logic may use a VM page table and a hypervisor page table that are maintained by the hypervisor, in order to perform the translation, as described in more detail herein.

At block 406, the processing logic may compare HPA 1 and HPA 2 to determine whether the two HPAs match, which in turn may indicate that the HVA from the hypercall is a valid address for the memory. At block 410, the processing device may make a decision of whether HPA 1 matches HPA 2 based on the results of the comparison. For example, the processing logic may determine that HPA 1 matches HPA 2 is the HPAs are identical to one another. At block 412, the processing device determines that HPA 1 matches HPA 2. In this case, the processing device may execute the hypercall using the HVA, as described in more detail herein.

On the other hand, at block 414, when the processing device determines that HPA 1 does not match HPA 2. In this case, the processing device may return an error to the VM, indicating that the HVA, the GPA, or both addresses of the memory buffer are invalid, as explained in more details herein above.

Figure 5:
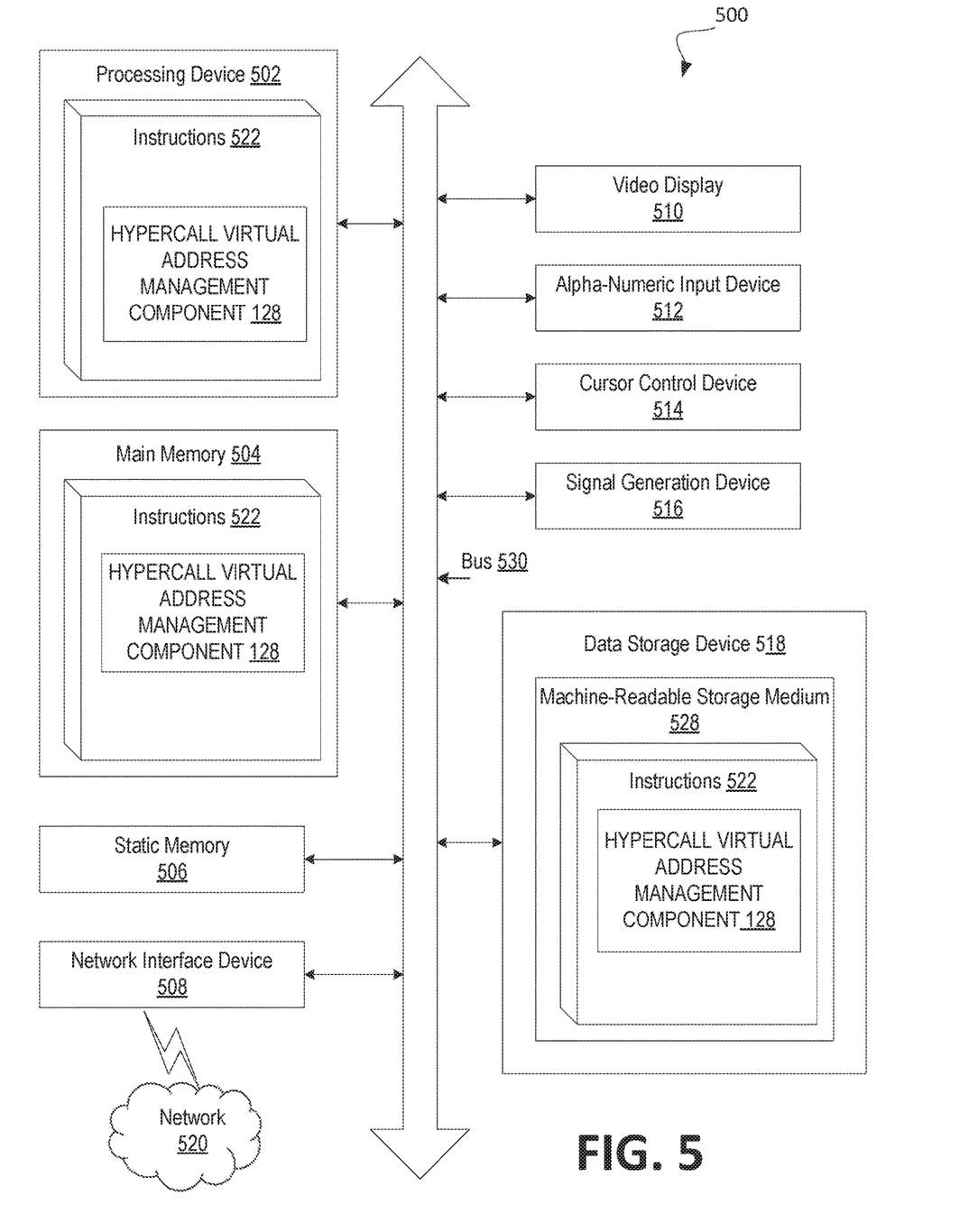
FIG. 5 depicts a block diagram of a computer system operating in accordance with one or more aspects of the disclosure.

FIG. 5 depicts a block diagram of a computer system operating in accordance with one or more aspects of the disclosure. In various illustrative examples, computer system 500 may correspond to a computing device 110 within system architecture 100 of FIG. 1. In one implementation, the computer system 500 may be the computer system 110 of FIG. 1. The computer system 500 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other via a bus 530.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 508. Computer system 500 also may include a video display unit 510 (e.g., an LCD), an alphanumeric input device 512 (e.g., a keyboard), a cursor control device 514 (e.g., a mouse), and a signal generation device 516.

Data storage device 518 may include a non-transitory computer-readable storage medium 528 on which may store instructions 522 embodying any one or more of the methodologies or functions described herein (e.g., hypercall virtual address management component 128). Instructions 522 may also reside, completely or partially, within volatile memory 504 and/or within processing device 502 during execution thereof by computer system 500, hence, volatile memory 504 and processing device 502 may also constitute machine-readable storage media.

While computer-readable storage medium 528 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, and 400, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
receiving, by a hypervisor managing a virtual machine (VM), a hypercall initiated by the VM, wherein a first parameter of the hypercall specifies a guest physical address (GPA) of a memory buffer and a second parameter of the hypercall specifies a host virtual address (HVA) of the memory buffer;
translating, by the hypervisor, the GPA to a first host physical address (HPA);
translating, by the hypervisor, the HVA to a second HPA;
comparing, by the hypervisor, the first HPA to the second HPA; and
responsive to determining that the first HPA matches the second HPA, executing, by the hypervisor, the hypercall using the HVA.

2. The method of claim 1 further comprising:
responsive to determining that the first HPA does not match the second HPA, returning an error code to the VM.

3. The method of claim 1 further comprising:
responsive to determining that the first HPA does not match the second HPA, notifying the VM of a second HVA corresponding to the GPA.

4. The method of claim 1, further comprising:
responsive to receiving, via a paravirtualized interface, a request from the VM, notifying the VM of the HVA corresponding to the GPA.

5. The method of claim 1, wherein translating the GPA to the first HPA is performed using a shadow page table maintained by the hypervisor.

6. The method of claim 1, wherein translating the HVA to the second HPA is performed using a hypervisor page table maintained by the hypervisor.

7. The method of claim 1, wherein executing the hypercall further comprises accessing, by the hypervisor, the memory buffer referenced by the HVA.

8. A system comprising:
a memory;
a processing device operatively coupled to the memory, the processing device to:
  receive a hypercall initiated by a virtual machine (VM), wherein a first parameter of the hypercall specifies a guest physical address (GPA) of a memory buffer and a second parameter of the hypercall specifies a host virtual address (HVA) of the memory buffer;
  translate the GPA to a first host physical address (HPA);
  translate the HVA to a second HPA;
  compare the first HPA to the second HPA; and
  responsive to determining that the first HPA matches the second HPA, execute the hypercall using the HVA.

9. The system of claim 8, wherein the processing device is further to:
  responsive to determining that the first HPA does not match the second HPA, return an error code to the VM.

10. The system of claim 8, wherein the processing device is further to:
  responsive to receiving, from a paravirtualized interface, a request from a VM, notify the VM of the HVA corresponding to the GPA.

11. The system of claim 8, wherein to translate the GPA to the first HPA, the processing device is to use a shadow page table maintained by a hypervisor managing the VM.

12. The system of claim 8, wherein to translate the HVA to the second HPA, the processing device is to use a hypervisor page table maintained by a hypervisor managing the VM.

13. The system of claim 8, wherein the processing device is further to:
  responsive to determining that the first HPA does not match the second HPA, notify the VM of a second HVA corresponding to the GPA.

14. The system of claim 8, wherein to execute the hypercall, the processing device is further to access the memory buffer referenced by the HVA.

15. A non-transitory computer-readable media storing instructions that, when executed, cause a processing device to:
  receive a hypercall initiated by a virtual machine (VM), wherein a first parameter of the hypercall specifies a guest physical address (GPA) of a memory buffer and a second parameter of the hypercall specifies a host virtual address (HVA) of the memory buffer;
  translate the GPA to a first host physical address (HPA);
  translate the HVA to a second HPA;
  compare the first HPA to the second HPA; and
  responsive to determining that the first HPA matches the second HPA, execute the hypercall using the HVA.

16. The non-transitory computer-readable media of claim 15, wherein to translate the GPA to the first HPA, the processing device is to use a shadow page table maintained by a hypervisor managing the VM.

17. The non-transitory computer-readable media of claim 15, wherein to translate the HVA to the second HPA, the processing device is to use a hypervisor page table maintained by a hypervisor managing the VM.

18. The non-transitory computer-readable media of claim 15, wherein the processing device is further to:
  responsive to determining that the first HPA does not match the second HPA, return an error code to the VM.

19. The non-transitory computer-readable media of claim 15, wherein the processing device is further to:
  responsive to receiving, from a paravirtualized interface, a request from the VM, notify the VM of the HVA corresponding to the GPA.

20. The non-transitory computer-readable media of claim 15, wherein to execute the hypercall, the processing device is further to access the memory buffer referenced by the HVA.

* * * * *